(12) United States Patent
Tamura

(10) Patent No.: US 10,919,344 B2
(45) Date of Patent: Feb. 16, 2021

(54) TIRE

(71) Applicant: BRIDGESTONE CORPORATION, Tokyo (JP)

(72) Inventor: Daisuke Tamura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 644 days.

(21) Appl. No.: 15/502,335

(22) PCT Filed: Jun. 26, 2015

(86) PCT No.: PCT/JP2015/068457
§ 371 (c)(1),
(2) Date: Feb. 7, 2017

(87) PCT Pub. No.: WO2016/021327
PCT Pub. Date: Feb. 11, 2016

(65) Prior Publication Data
US 2017/0225524 A1 Aug. 10, 2017

(30) Foreign Application Priority Data
Aug. 8, 2014 (JP) .............................. JP2014-162854

(51) Int. Cl.
*B60C 19/00* (2006.01)
*B60C 23/04* (2006.01)
(Continued)

(52) U.S. Cl.
CPC .......... *B60C 19/00* (2013.01); *B60C 23/0493* (2013.01); *G06K 19/07764* (2013.01);
(Continued)

(58) Field of Classification Search
CPC ..................................................... B60C 19/00
See application file for complete search history.

(56) References Cited

U.S. PATENT DOCUMENTS

| 2004/0159383 A1 | 8/2004 | Adamson et al. |
| 2006/0038665 A1 | 2/2006 | Jang |

(Continued)

FOREIGN PATENT DOCUMENTS

| CN | 101279574 A | 10/2008 |
| EP | 1995082 A1 | 11/2008 |

(Continued)

OTHER PUBLICATIONS

Communication dated Nov. 28, 2017, issued by the Intellectual Property Office of People's Republic of China in counterpart Application No. 2015800544130.
(Continued)

*Primary Examiner* — Joseph S Del Sole
*Assistant Examiner* — Melody Tsui
(74) *Attorney, Agent, or Firm* — Sughrue Mion, PLLC

(57) ABSTRACT

The RF tag known in the art incorporated in a tire has a problem that it can easily get distorted when the stresses occurring in the running tire converge on its vicinity. The present invention provides a tire (1) configured to prevent distortion from occurring in the RF tag (50) incorporated therein. The tire (1) includes an RF tag structure (50A) which is constructed of the RF tag (50) covered with a coating rubber (51). The modulus of elasticity of the coating rubber (51) is higher than that of the rubbers of the adjacent members (13, 32) located adjacently on the respective axial sides of the coating rubber (51).

20 Claims, 4 Drawing Sheets

(51) Int. Cl.
    *G06K 19/077*     (2006.01)
    *B29D 30/00*     (2006.01)

(52) U.S. Cl.
    CPC ............... *B29D 2030/0077* (2013.01); *B29D 2030/0083* (2013.01); *B60C 23/0433* (2013.01)

(56) References Cited

U.S. PATENT DOCUMENTS

| | | | |
|---|---|---|---|
| 2008/0289736 A1* | 11/2008 | Adamson | B60C 23/0493 152/152.1 |
| 2011/0175778 A1 | 7/2011 | Myatt | |
| 2012/0291936 A1 | 11/2012 | Lionetti et al. | |

FOREIGN PATENT DOCUMENTS

| | | |
|---|---|---|
| JP | 2006-059363 A | 3/2006 |
| JP | 2006-507967 A | 3/2006 |
| JP | 2006-188143 A | 7/2006 |
| JP | 2007049351 A | 2/2007 |
| JP | 2007-230261 A | 9/2007 |
| JP | 2007230261 A * | 9/2007 |
| JP | 2012-240680 A | 12/2012 |

OTHER PUBLICATIONS

International Search Report of PCT/JP2015/068457 dated Sep. 29, 2015.
International Preliminary Report on Patentability and translation of Written Opinion dated Feb. 23, 2017 from the International Bureau in counterpart International Application No. PCT/JP2015/068457.
Communication dated Jul. 17, 2017, from the European Patent Office in counterpart European Application No. 15829158.3.

* cited by examiner

FIG. 4

| | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|
| MODULUS OF ELASTICITY OF COATING RUBBER (M25 (Mpa)) | 1.7 | 1.98 | 1.56 | 1.58 | 0.87 | 0.97 | 0.99 | 0.71 |
| TIRE DURABILITY DRUM TEST (75,000 KM RUNNING) | ABSENT | ABSENT | ABSENT | ABSENT | PRESENT | PRESENT | PRESENT | PRESENT |
| TIRE DURABILITY DRUM TEST (150,000 KM RUNNING) | ABSENT | ABSENT | PRESENT | ABSENT | PRESENT | PRESENT | PRESENT | PRESENT |
| COATING RUBBER TO SIDE RUBBER INDEX | 269 | 314 | 247 | 250 | 138 | 153 | 157 | 112 |
| COATING RUBBER TO HAT RUBBER INDEX | 118 | 138 | 109 | 110 | 60 | 67 | 69 | 49 |

FIG.5

| | COMPARATIVE EXAMPLE 1 | COMPARATIVE EXAMPLE 2 | COMPARATIVE EXAMPLE 3 | EXAMPLE 1 | EXAMPLE 2 |
|---|---|---|---|---|---|
| (COATING RUBBER VOLUME RATIO) | | | | | |
| COATING RUBBER AXIALLY INNER PORTION VOLUME: S1 [mm$^3$] | 2.32 | 1.52 | 1.99 | 1.55 | 2.14 |
| COATING RUBBER AXIALLY OUTER PORTION VOLUME: S2 [mm$^3$] | 2.35 | 1.48 | 1.58 | 1.05 | 1.54 |
| S2/S1 | 1.01 | 0.97 | 0.79 | 0.68 | 0.73 |
| (RF TAG POSITION) | | | | | |
| RF TAG POSITION RELATIVE TO DISTANCE FROM BEAD CORE CENTER TO SOFT STIFFENER END: L | 0.33L | 1.16L | 0.48L | 0.42L | 1.06L |
| (TIRE TEST) | | | | | |
| CEASING AT CURING (RUBBER FISSURE) | PRESENT | PRESENT | PRESENT | ABSENT | ABSENT |
| RF TAG-INDUCED FAILURE IN TIRE BEAD DURABILITY TEST | PRESENT | PRESENT | ABSENT (※) | ABSENT | ABSENT |

※ CEASING DEVELOPING

TIRE

CROSS REFERENCE TO RELATED APPLICATIONS

This application is a National Stage of International Application No. PCT/JP2015/068457 filed Jun. 26, 2015, claiming priority based on Japanese Patent Application No. 2014-162854 filed Aug. 8, 2014, the contents of all of which are incorporated herein by reference in their entirety.

TECHNICAL FIELD

The present invention relates to a tire incorporating an RF tag structure constructed of an RF (Radio Frequency) tag covered with a coating rubber.

BACKGROUND ART

There are tires known in the art which incorporate an RF tag equipped with a memory and antenna enabling reading and writing of data regarding manufacturing management, delivery management, usage history management, and the like of the tire (see Patent Document 1).

CONVENTIONAL ART DOCUMENT

Patent Document

Patent Document 1: Japanese Unexamined Patent Application Publication No. 2012-240680

SUMMARY OF THE INVENTION

Problem to be Solved by the Invention

However, in the tire as disclosed in Patent Document 1, the RF tag can be easily distorted if the distortions occurring inside the tire while running converge on the vicinity of the RF tag.

The present invention provides a tire so designed that distortion does not occur easily in the RF tag incorporated therein.

Means for Solving the Problem

The tire according to the present invention is one incorporating an RF tag structure constructed of an RF tag covered with a coating rubber. And the modulus of elasticity of the coating rubber covering the RF tag is higher than that of the rubbers of adjacent members located adjacently on the respective axial sides of the coating rubber.

BRIEF DESCRIPTION OF THE DRAWINGS

FIG. 4 is a table showing the test results of examples.

FIG. 5 is a table showing the test results of examples.

Hereinafter, the invention will be described in detail based on preferred embodiments which do not intend to limit the scope of the claims of the present invention but exemplify the invention. And all of the features and the combinations thereof described in the embodiments are not necessarily essential to the invention, and they also include constructions and arrangements to be employed selectively.

BEST MODE FOR CARRYING OUT THE INVENTION

First Embodiment

Figure 1:
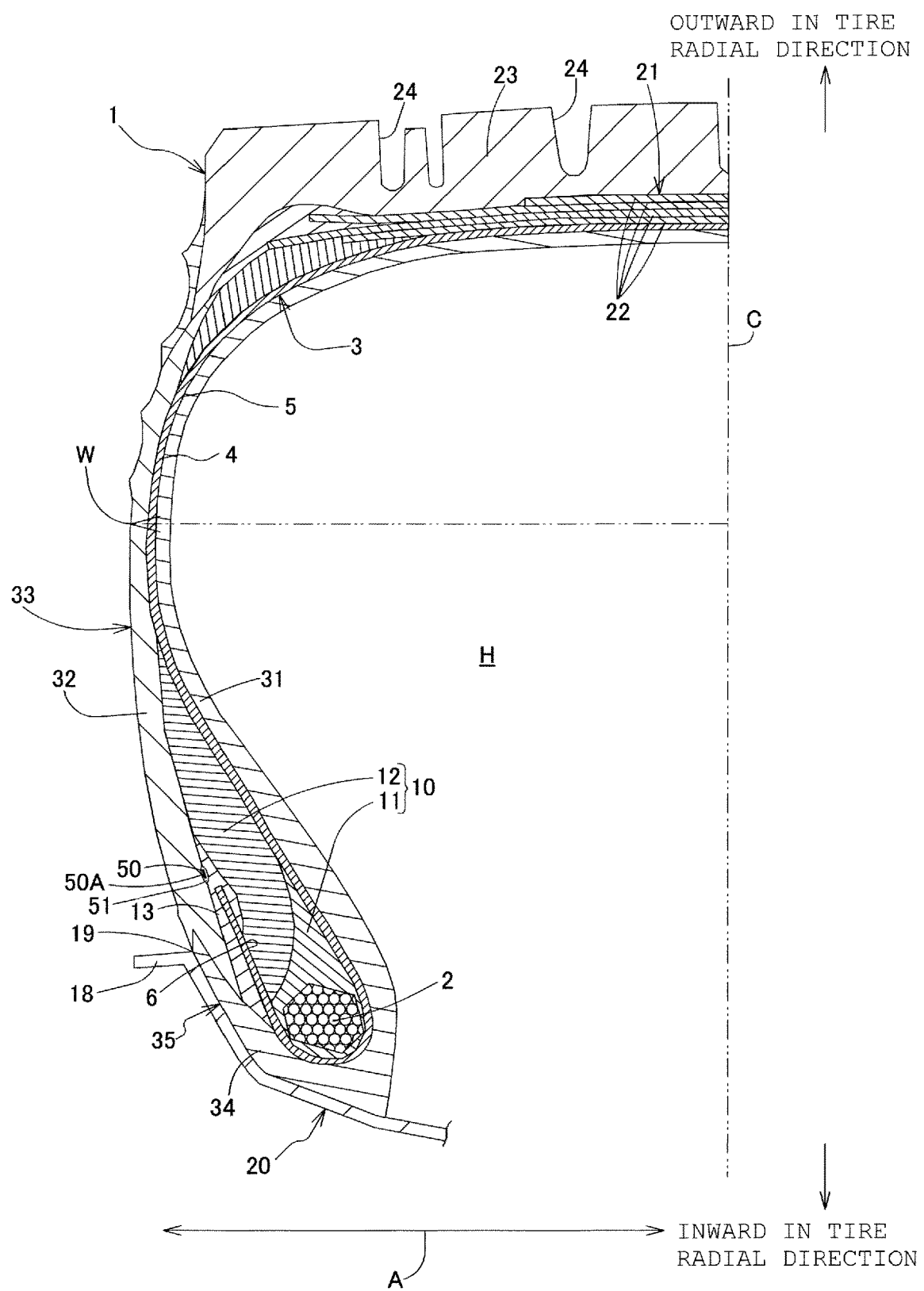
FIG. 1 is a half cross-sectional view of a tire (first embodiment).

As shown in FIG. 1, a tire 1 according to the first embodiment includes a bead core 2 and a carcass layer 2, and the carcass layer 2 comprises at least one carcass ply 4. The carcass ply 4 has a main body portion 5 in a toroidal shape astride a pair of bead cores 2, 2 and turned-back portions 6 extending from the main body part 5, wrapping around the bead core 2, and turned back in the tire radial direction.

The carcass ply 4 is, for instance, a sheet-shaped member of a plurality of cords arranged parallelly and covered with rubber. The plurality of cords are so disposed as to extend radially about the central axis of rotation of the tire.

The component with reference numeral 10 is a stiffener which extends in the tire radial direction along the main body portion 5 of the carcass ply 4. The stiffener 10 is comprised of a hard stiffener portion 11, which is located between the main body portion 5 and the turned-back portion 6 of the carcass ply 4 and in close contact therewith on a radially inner side of the tire, and a soft stiffener portion 12, which is located between the main body portion 5 and the turned-back portion 6 and in close contact therewith on a radially outer side of the tire.

The hard stiffener portion 11 is formed of a rubber whose Shore A hardness is 70 or higher, for instance. The soft stiffener portion 12 is formed of a rubber which is softer than the hard stiffener portion 11 with the Shore A hardness being 58 to 68, for instance.

The component with reference numeral 13 is a ply end reinforcing rubber (hat rubber) provided to wrap around the end of the turned-back portion 6 of the carcass ply 4 to reinforce the end of the turned-back portion 6.

Provided on a radially outer side of the carcass layer 3 is a belt layer 21. And the belt layer 21 is constructed of a stack of two or more belt plies 22. The belt plies 22 are each a sheet-shaped member having a plurality of parallelly placed cords covered with rubber, for instance. The cords embedded in these belt plies intersect the equatorial plane C of the tire at a predetermined angle and get crossed between at least two belt plies 22, 22.

Disposed on a radially outer side of the belt layer 21 is a tread 23. And formed on the outer surface on the radially outer side of the tread 23 are a plurality of main grooves 24, which extend circumferentially around the tire, and a plurality of not-shown lateral grooves, which intersect the main grooves 24.

Also, the carcass ply 4 and the cords of the belt plies 22 are metal cords or organic fiber cords, for instance. The metal cords are, for example, strands formed of steel, brass, copper, alloy, or the like. The organic fiber cords are, for example, strands formed of an organic fiber, such as polyamide fiber, polyethylene naphthalate fiber, polyethylene telephthalate fiber, or the like.

It is to be noted that in FIG. 1, reference numeral 20 refers to a rim, 18 a rim flange, 31 an inner liner, 32 a side rubber constituting the outer surface of the sidewall 33, and 34 a rubber constituting the bead 35, which is a ring-shaped reinforcement covering the bead core 2. A signifies the axial direction of the tire.

Figure 2:
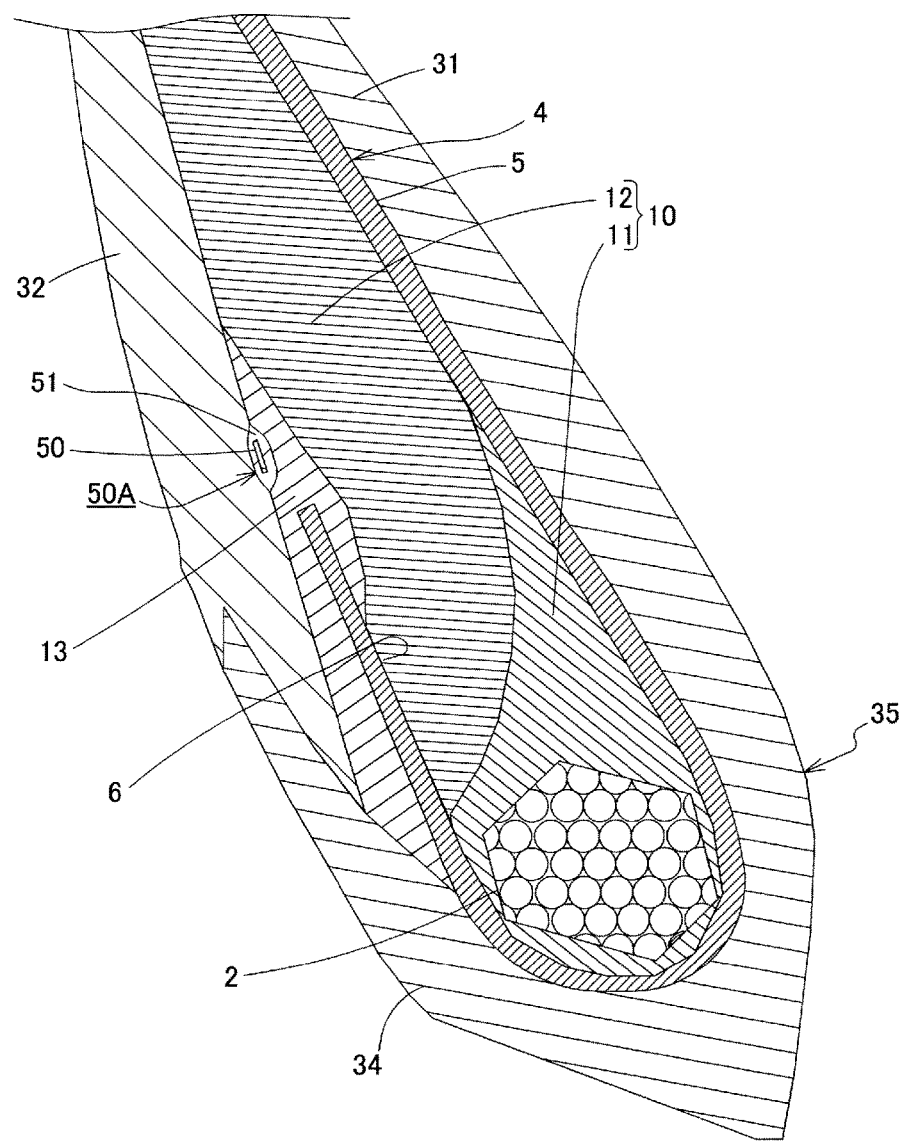
FIG. 2 is an enlarged feature cross-sectional view of a tire (first embodiment).

The tire 1 according to the first embodiment, as shown in FIGS. 1 and 2, is one incorporating an RF tag structure 50A which has an RF tag 50 covered with a coating rubber 51.

The RF tag 50 is a tag with a storage medium and not-shown antenna, employing not-shown non-contact IC chips, embedded in a not-shown plate. And it enables the reading and writing of data using a not-shown reader-writer.

In the tire 1 according to the first embodiment, the RF tag is so disposed as not to come in contact with the stiffener 10 which reinforces the bead 35 on the bead 35 side between the maximum width position W of the tire and the rim flange parting point 19. And the axially inner portion 51A (see FIG. 3) of the coating rubber 51 covering the RF tag 50 is located adjacent to the ply end reinforcing rubber (hat rubber) 13 as an inner adjacent member disposed in an axially inner (tire inner cavity (hollow cavity) H side) position. And the axially outer portion 51B (see FIG. 3) of the coating rubber 51 covering the RF tag 50 is located adjacent to the side rubber 32 as an outer adjacent member disposed in an axially outer position.

And the rubber used as the coating rubber 51 covering the RF tag 50 has a modulus of elasticity higher than that of the rubbers of the side rubber 32 and the ply end reinforcing rubber (hat rubber) 13 as the adjacent members located adjacently on the respective axial sides thereof. For example, a rubber having a modulus of elasticity of 1.70 Mpa is used as the coating rubber 51. A rubber having a modulus of elasticity of 0.63 Mpa is used as the side rubber 32. And a rubber having a modulus of elasticity of 1.43 Mpa is used as the ply end reinforcing rubber 13. It is to be noted that the values employed as the modulus of elasticity are ones measured as the tensile stress at 25% elongation (M (modulus) 25) in a tensile test performed in compliance with JIS K 6251.x That is, the arrangement is such that the modulus of elasticity of the coating rubber 51, as the tensile stress value at 25% elongation, is 10% or more higher than that of the rubbers of the adjacent members located adjacently on the respective axial sides thereof.

Figure 3:
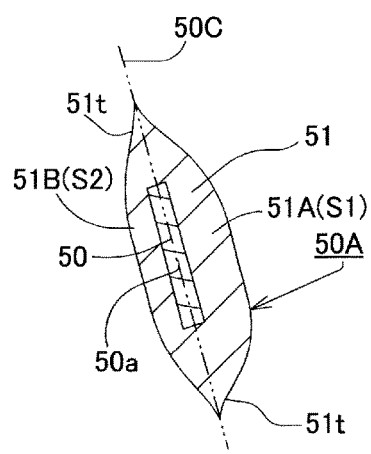
FIG. 3 is an enlarged cross-sectional view of an RF tag structure (fourth embodiment).

Further, the arrangement is such that the volume S1 of the axially inner portion 51A of the coating rubber 51 differs from the volume S2 of the axially outer portion 51B thereof, the border therebetween being the axial center line 50C passing through the axial center 50a of the RF tag incorporated in the tire 1 (see FIG. 3). For example, of the side rubber 32 and the ply end reinforcing rubber 13, which are the adjacent members located adjacently on the respective axial sides of the coating rubber 51, the side rubber 32 whose hardness is lower is placed adjacent to the axially outer portion 51B of the coating rubber 51 whose volume is smaller.

Also, as shown in FIGS. 1 to 3, the coating rubber 51 is so shaped in the cross section of the tire 1 as to taper off at the ends 51t, 51t thereof in the tire radial direction.

Furthermore, the arrangement is such that the turned-back portion 6 of the carcass ply 4 is located closer to the RF tag structure 50A.

In the tire according to the first embodiment, the RF tag 50 is covered with the coating rubber 51. Thus the coating rubber 51 effectively absorbs the stresses occurring inside the tire 1, making the RF tag more resistant to distortion.

Also, the rubber used as the coating rubber 51 of the RF tag structure 50A has a higher modulus of elasticity than that of the rubbers of the adjacent members on the respective axial sides thereof, which is preferably 10% or more higher in the tensile stress value at 25% elongation. As a result, there occurs a rigidity difference between the coating rubber 51 and the adjacent members, which will lessen the distortion converging on the interfaces between the coating rubber 51 and the adjacent members. This will produce a tire 1 incorporating an RF tag which is less susceptible to distortion.

Furthermore, it is so arranged that the volume S1 of the axially inner portion 51A of the coating rubber 51 differs from the volume S2 of the axially outer portion 51B thereof, the border therebetween being the axial center line 50c passing through the axial center 50a of the RF tag incorporated in the tire 1. As a result, when compared with the case where the volume of the axially inner portion 51A of the coating rubber 51 is the same as the volume S2 of the axially outer portion 51B thereof, there will be reduced chances of creasing to occur at the time of tire molding (a thin and shallow fissure capable of causing a crack from the tire surface to the tire inside).

In particular, of the adjacent members located on the respective axial sides of the coating rubber 51, the adjacent member with lower rubber hardness may be placed adjacent to the portion with smaller volume of the coating rubber. This may bring the adjacent member with lower rubber hardness into contact with the portion of the coating rubber 51 which is small in volume and of more pliable rubber, thus reducing the risk of creasing at the time of tire molding. For example, the axially outer portion 51B with smaller volume is placed in contact with the side rubber 32, which is the adjacent member with lower rubber hardness, thus reducing the risk of creasing at the time of tire molding.

Also, the coating rubber 51 is so shaped as to taper off at the ends 51t, 51t thereof in the tire radial direction. This will reduce the risk of creasing at the time of tire molding.

Furthermore, metal cords may be employed as the cords of the carcass ply 4. This will allow the metal cords embedded in the carcass ply 4 to be utilized as the antenna of the RF tag 50, which will improve the communication performance of the RF tag 50.

When the tire 1 is running, there occur relatively more distortions in the radially outer region from the tire maximum width position W and less distortions in the radially inner region from the tire maximum width position W.

In the tire 1 according to the first embodiment, the RF tag is located on the bead 35 side of the maximum width position W of the tire. Therefore, distortion is less likely to occur in the RF tag incorporated in the tire.

Furthermore, in the tire 1 according to the first embodiment, the RF tag is so disposed that it does not come in contact with the stiffener 10 reinforcing the bead 35, in particular with the hard stiffener 11 made of a harder rubber. Thus, subject to less forces from the stiffener 10, distortion is less likely to occur in the RF tag incorporated in the tire.

It is to be noted that the term "rim flange parting point" refers to the radially outermost point where the tire 1 comes in contact with the rim flange 18 of the rim 20 when the pneumatic tire is fitted on the rim 20.

When the tire 1 fitted on the rim 20 means when the tire 1 is fitted on a regular rim specified by the standard at an air pressure corresponding to the maximum load specified by the standard.

Also, the term "maximum width position" refers to the maximum width position in an axial cross section of the tire fitted on the regular rim inflated at air pressure within a regular internal pressure range with no load placed thereon.

The term "regular rim" refers to a "standard rim" as specified by JATMA, a "design rim" as specified by TRA, or a "measuring rim" as specified by ETRTO.

The term "regular internal pressure" refers to a "maximum air pressure" as specified by JATMA, a maximum value of "tire load limits at various cold-inflation pressures" as specified by TRA, or "inflation pressures" as specified by ETRTO.

FIG. 4 shows the results of experimentation conducted to verify the effects of the arrangement of the first embodiment.

For the experiment, tires incorporating an RF tag covered with a coating rubber having different moduli of elasticity were prepared as Examples 1 to 4 and Comparative Examples 1 to 4 as shown in FIG. 4. They were all under the conditions of the modulus of elasticity of the side rubber 32 of 0.63 Mpa (M25) and the modulus of elasticity of the ply end reinforcing rubber (hat rubber) of 1.43 Mpa (M25). Prior to testing, all the tires were subjected to a deterioration process to approximate the actual use conditions. A durability drum test was conducted on the tires fitted on the rim under the conditions of the rim size of 8.25×22.5, test air pressure of 800 kPa, load of 3300 kg, and drum speed of 60 km/h. Then, after the running of 75,000 km and 150,000 km, respectively, the presence or absence of RF tag-induced failure in the tires was checked to determine the presence or absence of RF tag-induced failure depending on the difference in the modulus of elasticity.

The index showing the ratio of coating rubber to side rubber is 100 when the modulus of elasticity (M25) of coating rubber is the same as that of side rubber. That is, the index is "modulus of elasticity (M25) of coating rubber/modulus of elasticity (M25) of side rubber×100". Also, the index showing the ratio of coating rubber to hat rubber is 100 when the modulus of elasticity (M25) of coating rubber is the same as that of hat rubber. That is, the index is "modulus of elasticity (M25) of coating rubber/modulus of elasticity (M25) of hat rubber×100".

As is clear from the results shown in FIG. 4, Comparative Examples 1 to 4 showed that after the running of both 75,000 km and 150,000 km, there was the presence of RF tag-induced failure in the tires when at least one of the indexes of the ratio of coating rubber to side rubber and the ratio of coating rubber to hat rubber is less than 100. On the other hand, as shown in Examples 1, 2, and 4, there was the absence of RF tag-induced failure in the tires when both the indexes of the ratio of coating rubber to side rubber and the ratio of coating rubber to hat rubber is 110 or above (that is, when the modulus of elasticity of the coating rubber covering the RF tag is 10% or more higher than that of the rubbers of the adjacent members located adjacently on the respective axial sides thereof).

It is to be noted that as in the third embodiment, when at least one of the indexes of the ratio of coating rubber to side rubber and the ratio of coating rubber to hat rubber is 100 or above and less than 110, there were no RF tag-induced failures after the running of 75,000 km, but there were RF tag-induced failures after the running of 150,000 km.

From this, it became clear that the critical point for the occurrence of RF tag-induced failure is when the index of the ratio of coating rubber to adjacent member is 110. That is, it was determined that the critical point for the occurrence of RF tag-induced failure is where the modulus of elasticity of the coating rubber covering the RF tag is 10% higher than that of the rubbers of the adjacent members located adjacently on the respective axial sides thereof.

Second Embodiment

The modulus of elasticity of the coating rubber 51 covering the RF tag 50 is smaller than that of the material having the greatest modulus of elasticity of the constituent materials of the RF tag 50 coming in contact with the coating rubber 51. For example, the plate of the RF tag 50 is formed of a material having the greatest modulus of elasticity of the constituent materials of the RF tag 50. At the same time, the rubber used as the coating rubber 51 has a modulus of elasticity smaller than that of the plate of the RF tag 50. This will prevent an excessive rigidity difference from occurring between the coating rubber 51 and the adjacent members located adjacent thereto. Moreover, this makes it less likely that distortion is communicated from the coating rubber to the RF tag. As a result, a tire 1 incorporating an RF tag can be obtained which is less susceptible to the distortion of the RF tag 50 incorporated therein.

Third Embodiment

The length in the tire radial direction of the coating rubber 51 covering the RF tag 50 is shorter than that of the adjacent members located adjacent thereto and that the rigidity of the coating rubber 51 is lower than that of the adjacent members located adjacent thereto. This makes it less likely that the distortion of the adjacent members is communicated to the RF tag. As a result, the RF tag incorporated in the tire is less susceptible to distortion.

The arrangement is further such that both ends of the coating rubber 51 in the tire radial direction are 5 mm or more apart from the ends of the other members within the tire 1. As a result, the RF tag 50 is located in an area on the bead 35 side with least distortion where it receives no up-thrust forces from the ends of the other members within the tire 1 or the rim 20. Accordingly, it is less likely that distortion occurs in the RF tag 50.

Fourth Embodiment

The volumetric ratio (S=S2/S1) between the volume S1 of the axially inner portion 51A and the volume S2 of the axially outer portion 51B of the coating rubber 51 with the border therebetween being the axial center line 50c passing through the axial center 50a of the RF tag 50 is S<0.75. This prevents creasing from occurring at the time of tire molding. Also, as shown in FIG. 3, the axially inner portion 51A of the coating rubber 51 has a larger volume S1 while the axially outer portion 51B thereof has a smaller volume S2. Thus the side rubber 32, which is an adjacent member with lower rubber hardness, comes in contact with the axially outer portion 51B of a smaller volume of the coating rubber 51 whose rubber is more pliable. This reduces the chances of creasing to occur at the time of tire molding.

FIG. 5 shows the results of experimentation conducted to verify the effects of the arrangements of the first to fourth embodiments.

As is clear from FIG. 5, there was no occurrence of creasing under the test conditions that the position of the RF tag is 0.42 L and 1.06 L (condition of the first embodiment), L being the distance from the center of the bead core 2 to the radially outer end of the soft stiffener 12 and that the volumetric ratio (S=S2/S1) between the volume S1 of the axially inner portion 51A and the volume S2 of the axially outer portion 51B of the coating rubber 51 is 0.68 and 0.73 (condition of the fourth embodiment). Also, by a tire bead durability test, it was found that a tire 1 incorporating an RF tag 50 can be obtained which is free from RF tag 50-induced failure.

Also, it is to be noted that in the experimentation, the conditions other than those shown in FIG. 5 were the same as that of the first to third embodiments.

Fifth Embodiment

The modulus of elasticity of the coating rubber 51 covering the RF tag 50 is 1.5 times or more higher than that of the rubber of at least one of the adjacent members located adjacently on the respective axial sides thereof. Preferably, the rubber used as the coating rubber 51 covering the RF tag 50 has a modulus of elasticity about 1.5 to 2.5 times higher than that of the rubber of at least one of the adjacent members located adjacently on the respective axial sides thereof. This will create a rigidity difference between the coating rubber 51 and at least one of the adjacent members, thus reducing the distortion converging on the interface between the coating rubber 51 and at least one of the adjacent members. As a result, a tire 1 less susceptible to the distortion in the RF tag 50 incorporated therein can be realized. For example, use of a rubber as the coating rubber 51 whose modulus of elasticity is about 1.5 to 2.5 times higher than that of the side rubber 32 will create a rigidity difference between the coating rubber 51 and the side rubber 32. Consequently, the distortion converging on the interface between the coating rubber 51 and the side rubber 32 will be reduced, and thus a tire 1 resistant to the distortion in the RF tag 50 incorporated therein can be realized.

It is to be noted that in the foregoing embodiments, the side rubber 32, which is made of a rubber with relatively low hardness, is disposed on the axially outer side of the tire, and the soft stiffener 12, which is made of a rubber with relatively low hardness, is disposed on the axially inner side of the tire (tire inner cavity H side). Accordingly, these rubbers with relatively low hardness absorb distortions occurring in the tire. Hence, forces cannot be easily communicated to the RF tag 50, and it is less likely that distortion occurs in the RF tag 50.

Also, in the fourth embodiment, an example was described in which the axially inner portion 51A of the coating rubber 51 has a larger volume S1 while the axially outer portion 51B thereof has a smaller volume S2. However, the coating rubber 51 to be used may also be such that the axially inner portion 51A of the coating rubber 51 has a smaller volume while the axially outer portion 51B has a larger volume S2.

As described hereinbefore, the tire according to the present invention is a tire incorporating an RF tag structure constructed of an RF tag 50 covered with a coating rubber. And the modulus of elasticity of the coating rubber is higher than that of the rubbers of the adjacent members on the respective axial sides thereof. As a result, there occurs a rigidity difference between the coating rubber and the adjacent members. This will allow the distortion to converge on the interfacial boundaries between the coating rubber and the adjacent members, thus lessening the distortion between the RF tag and coating rubber. This will produce a tire 1 incorporating an RF tag which is more resistant to distortion.

Also, the modulus of elasticity of the coating rubber covering the RF tag is 10% or more higher than that of the rubbers of the adjacent members located adjacently on the respective axial sides. This will allow the distortion during the running of the tire to converge on the interfaces between the coating rubber and the adjacent members, thus lessening the distortion between the RF tag and coating rubber. As a result, distortion is less likely to occur in the RF tag incorporated in the tire.

Also, the modulus of elasticity of the coating rubber covering the RF tag is smaller than that of the material having the greatest modulus of elasticity of the constituent materials of the RF tag coming in contact with the coating rubber. This will prevent an excessive rigidity difference from occurring between the coating rubber and the adjacent members adjacent thereto. Moreover, this makes it less likely that the distortion is communicated from the coating rubber to the RF tag, making a tire more resistant to the distortion of the RF tag incorporated therein.

Also, the length in the tire radial direction of the coating rubber covering the RF tag is shorter than that of the adjacent members located adjacent thereto, and the rigidity of the coating rubber 51 is lower than that of the adjacent members located adjacent thereto. This makes it less likely that the distortion of the adjacent members is communicated to the RF tag. As a result, the RF tag incorporated in the tire becomes more resistant to distortion.

Furthermore, the modulus of elasticity of the coating rubber covering the RF tag is 1.5 times or more higher than that of the rubber of at least one of the adjacent members located adjacently on the respective axial sides thereof. This makes it harder for the distortion to occur in the RF tag.

DESCRIPTION OF REFERENCE NUMERALS 1 tire
13 ply end reinforcing rubber (adjacent member)
32 side rubber (adjacent member)
50 RF tag
50A RF tag structure
51 coating rubber

The invention claimed is:

1. A tire incorporating an RF tag structure, the RF tag structure comprising:
    an RF tag; and
    a coating rubber covering the RF tag,
    wherein a modulus of elasticity of the coating rubber covering the RF tag is higher than a modulus of elasticity of rubbers of adjacent members located adjacently on respective axial sides of the coating rubber, the RF tag being so located that it does not come in contact with a stiffener which reinforces a bead of the tire on a bead side, and the RF tag being located between a maximum width position of the tire and a rim flange parting point.

2. The tire according to claim 1, wherein an axial inner portion of the coating rubber is adjacently located on a ply end reinforcing rubber being a rubber material in the axial inner portion amongst the adjacent members.

3. The tire according to claim 1, wherein an axial outer portion of the coating rubber contacts with a side rubber being an outer surface of a wide wall, amongst the adjacent members.

4. The tire according to claim 2, wherein an axial outer portion of the coating rubber contacts with a side rubber being an outer surface of a wide wall, amongst the adjacent members.

5. The tire according to claim 2, wherein a length of the ply end reinforcing rubber in a tire radial direction is shorter than a length of the stiffener in the tire radial direction, the stiffener extending in the tire radial direction along with a body of carcass ply.

6. The tire according to claim 1, wherein the coating rubber is so shaped in a cross section of the tire as to taper off at ends in a tire radial direction.

7. The tire according to claim 2, wherein the coating rubber is so shaped in a cross section of the tire as to taper off at ends in a tire radial direction.

8. The tire according to claim 3, wherein the coating rubber is so shaped in a cross section of the tire as to taper off at ends in a tire radial direction.

9. The tire according to claim 1, volume of an axial inner portion of the coating rubber differs from volume of an axial outer portion of the coating rubber, as a border being an axial center line passing through a center of the RF tag in a tire axial direction.

10. The tire according to claim 2, volume of the axial inner portion of the coating rubber differs from volume of an axial outer portion of the coating rubber, as a border being an axial center line passing through a center of the RF tag in a tire axial direction.

11. The tire according to claim 9, an adjacent member with lower rubber hardness amongst the adjacent members, which are located adjacently on the respective axial sides of the coating rubber, is placed adjacently to a portion of the coating rubber whose volume is smaller.

12. The tire according to claim 10, an adjacent member with lower rubber hardness amongst the adjacent members, which are located adjacently on the respective axial sides of the coating rubber, is placed adjacent to a portion of the coating rubber whose volume is smaller.

13. The tire according to claim 1, wherein the modulus of elasticity of the coating rubber covering the RF tag is 10% or more higher than the modulus of elasticity of the rubbers of the adjacent members located adjacently on the respective axial sides of the coating rubber.

14. The tire according to claim 2, wherein the modulus of elasticity of the coating rubber covering the RF tag is 10% or more higher than the modulus of elasticity of the rubbers of the adjacent members located adjacently on the respective axial sides of the coating rubber.

15. The tire according to claim 1, wherein the modulus of elasticity of the coating rubber covering the RF tag is lower than the modulus of elasticity of the material whose modulus of elasticity is the highest of constituting materials of the RF tag in contact with the coating rubber.

16. The tire according to claim 2, wherein the modulus of elasticity of the coating rubber covering the RF tag is lower than the modulus of elasticity of the material whose modulus of elasticity is the highest of the constituting materials of the RF tag in contact with the coating rubber.

17. The tire according to claim 1, a length of the coating rubber covering the RF tag in the tire radial direction is shorter than a length of the adjacent members in a tire radial direction.

18. The tire according to claim 2, a length of the coating rubber covering the RF tag in a tire radial direction is shorter than a length of the adjacent members in a tire radial direction.

19. The tire according to claim 1, wherein the modulus of elasticity of the coating rubber covering the RF tag is 1.5 times or more higher than the modulus of elasticity of rubber of at least one of the adjacent members located adjacently on the respective axial sides of the coating rubber.

20. The tire according to claim 2, wherein the modulus of elasticity of the coating rubber covering the RF tag is 1.5 times or more higher than the modulus of elasticity of rubber of at least one of the adjacent members located adjacently on the respective axial sides of the coating rubber.

* * * * *